United States Patent
Clerckx et al.

(10) Patent No.: US 9,094,251 B2
(45) Date of Patent: Jul. 28, 2015

(54) MULTIPLE INPUT MULTIPLE OUTPUT COMMUNICATION METHOD AND SYSTEM FOR EXCHANGING COORDINATED RANK INFORMATION FOR NEIGHBOR CELL

(75) Inventors: Bruno Clerckx, Seoul (KR); Jin Kyu Han, Seoul (KR); Heun Chul Lee, Hwaseong-si (KR); Young Jun Hong, Seoul (KR); Ki Il Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 13/022,343

(22) Filed: Feb. 7, 2011

(65) Prior Publication Data

US 2011/0194632 A1  Aug. 11, 2011

Related U.S. Application Data

(60) Provisional application No. 61/302,985, filed on Feb. 10, 2010.

(30) Foreign Application Priority Data

Aug. 17, 2010 (KR) .................. 10-2010-0079431

(51) Int. Cl.
*H04K 1/10* (2006.01)
*H04L 25/03* (2006.01)
(Continued)

(52) U.S. Cl.
CPC .......... *H04L 25/03343* (2013.01); *H04B 7/024* (2013.01); *H04B 7/063* (2013.01); *H04L 2025/03426* (2013.01); *H04L 2025/03808* (2013.01)

(58) Field of Classification Search
CPC . H04L 5/0007; H04L 25/03343; H04L 47/14; H04L 47/2425; H04L 5/0023; H04L 5/0037; H04L 5/0035; H04L 1/0026; H04L 1/0001; H04B 7/0417; H04B 7/0478; H04B 7/0639; H04B 7/0697; H04B 1/7143; H04B 7/2621; H04B 7/0626; H04B 7/0452; H04B 7/0632; H04B 7/024; H04B 7/0413; H04J 11/0053
USPC ........ 370/200–546; 375/130–377; 455/1–899
See application file for complete search history.

(56) References Cited

U.S. PATENT DOCUMENTS

| 6,925,303 | B2 | 8/2005 | Mohebbi et al. |
| 8,380,215 | B2 * | 2/2013 | Seo et al. .................. 455/452.1 |

(Continued)

FOREIGN PATENT DOCUMENTS

| JP | 2009-112001 | 5/2009 |
| KR | 10-2008-0086726 | 9/2008 |

(Continued)

OTHER PUBLICATIONS

T. Eriksson and T Ottosson, "Compression of Feedback in Adaptive OFDM-Based Systems using Scheduling" Nov. 2007, IEEE, vol. 11, p. 859-861).*

(Continued)

*Primary Examiner* — Daniel Washburn
*Assistant Examiner* — Amneet Singh
(74) *Attorney, Agent, or Firm* — NSIP Law

(57) ABSTRACT

Provided is a multiple input multiple output (MIMO) communication method and system that may exchange information associated with a coordinated rank for a neighbor cell. In a MIMO communication system, a target terminal may feed back the information associated with the coordinated rank to a serving base station, and the serving base station may exchange the information associated with the coordinated rank with the neighbor base station. The serving base station may perform precoding based on the exchanged information associated with the coordinated rank.

35 Claims, 8 Drawing Sheets

(51) Int. Cl.
*H04B 7/02* (2006.01)
*H04B 7/06* (2006.01)

(56) References Cited

U.S. PATENT DOCUMENTS

| | | | |
|---|---|---|---|
| 2006/0019709 A1* | 1/2006 | Kim et al. | 455/562.1 |
| 2006/0285585 A1* | 12/2006 | Sampath | 375/227 |
| 2008/0009256 A1 | 1/2008 | Anderson | |
| 2008/0080635 A1* | 4/2008 | Hugl et al. | 375/267 |
| 2008/0095133 A1 | 4/2008 | Kodo et al. | |
| 2008/0108310 A1* | 5/2008 | Tong et al. | 455/69 |
| 2008/0229177 A1* | 9/2008 | Kotecha | 714/776 |
| 2009/0103486 A1 | 4/2009 | Hunukumbure et al. | |
| 2009/0109873 A1* | 4/2009 | Shen et al. | 370/254 |
| 2009/0201861 A1* | 8/2009 | Kotecha | 370/329 |
| 2009/0264142 A1 | 10/2009 | Sankar et al. | |
| 2010/0002643 A1* | 1/2010 | Han et al. | 370/329 |
| 2010/0035555 A1* | 2/2010 | Bala et al. | 455/63.1 |
| 2010/0091893 A1* | 4/2010 | Gorokhov | 375/260 |
| 2010/0144334 A1* | 6/2010 | Gorokhov et al. | 455/418 |
| 2010/0195527 A1* | 8/2010 | Gorokhov et al. | 370/252 |
| 2010/0202308 A1* | 8/2010 | Gorokhov et al. | 370/252 |
| 2010/0238889 A1* | 9/2010 | Kim et al. | 370/329 |
| 2010/0239036 A1* | 9/2010 | Koo et al. | 375/260 |
| 2010/0271931 A1* | 10/2010 | Cheng et al. | 370/210 |
| 2011/0034192 A1* | 2/2011 | Lim et al. | 455/501 |
| 2011/0170427 A1* | 7/2011 | Koivisto et al. | 370/252 |
| 2011/0235620 A1* | 9/2011 | Ahn et al. | 370/336 |
| 2011/0237270 A1* | 9/2011 | Noh et al. | 455/450 |
| 2012/0040702 A1* | 2/2012 | Wu et al. | 455/501 |

FOREIGN PATENT DOCUMENTS

| | | |
|---|---|---|
| KR | 10-2009-0103661 | 10/2009 |
| WO | WO 2009/120048 A2 | 10/2009 |

OTHER PUBLICATIONS

European Search Report issued Aug. 2, 2013 in corresponding EP Patent Application No. 11742406.9.

* cited by examiner

MULTIPLE INPUT MULTIPLE OUTPUT COMMUNICATION METHOD AND SYSTEM FOR EXCHANGING COORDINATED RANK INFORMATION FOR NEIGHBOR CELL

CROSS-REFERENCE TO RELATED APPLICATION(S)

This application claims the benefit under 35 U.S.C. §119(e) of U.S. Provisional Application No. 61/302,985, filed on Feb. 10, 2010, in the U.S. Patent and Trademark Office, and the benefit under 35 U.S.C. §119(a) of Korean Patent Application No. 10-2010-0079431, filed on Aug. 17, 2010, in the Korean Intellectual Property Office, the entire disclosures of which are incorporated herein by reference.

BACKGROUND

1. Field

The following description relates to a multiple input multiple output (MIMO) communication method and system, and more particularly, to a MIMO communication method and system using rank information.

2. Description of Related Art

In a MIMO communication system, a terminal may measure a channel from a base station. The terminal may feed back information associated with the measured channel to the base station, and the base station may perform precoding based on the information fed back from the terminal. However, when cells do not cooperate with each other, a terminal located near an edge of a cell may have its communications interfered with by a base station in a neighbor cell.

SUMMARY

In one general aspect, there is provided a communication method of a target terminal corresponding to a serving base station in a multi-cell communication system, the method including determining a preferred rank with respect to the serving base station, determining a coordinated rank with respect to at least one neighbor base station causing interference to the target terminal, transmitting information associated with the preferred rank to the serving base station or the at least one neighbor base station, and transmitting information associated with the coordinated rank to the serving base station or the at least one neighbor base station.

The determining of the coordinated rank may include determining the coordinated rank based on the preferred rank, such that an amount of interference received from the at least one neighbor base station is minimized.

The determining of the coordinated rank may include determining the coordinated rank including a recommended rank or a restricted rank with respect to the at least one neighbor base station.

The determining of the coordinated rank may include determining at least one of a recommended rank, a range of the recommended rank, a restricted rank, and a range of the restricted rank with respect to the at least one neighbor base station, and the transmitting may include transmitting the information associated with the coordinated rank including at least one of the recommend rank, the range of the recommended rank, the restricted rank, and the range of the restricted rank.

The determining of the coordinated rank may include generating information associated with an increase in performance expected when the coordinated rank is applied by the at least one neighbor base station, and the transmitting information associated with the coordinated rank further includes transmitting information associated with the increase in performance expected.

The method may further include generating identification information associated with the at least one neighbor base station, and the transmitting information associated with the coordinated rank may further include transmitting the identification information.

The determining of the coordinated rank may include determining the coordinated rank based on at least one of a type of reception filter used by the target terminal, channel quality information (CQI), a characteristic of a pilot signal used for channel estimation, the preferred rank, and a number of antennas of the target terminals.

The transmitting information associated with the coordinated rank may further include transmitting based on an uplink resource that is different from a resource used for the information associated with the preferred rank and a precoding matrix indicator (PMI).

The transmitting information associated with the preferred rank may further include compressing the information associated with the preferred rank, and the transmitting information associated with the coordinated rank may further include compressing the information associated with the coordinated rank, wherein the respectively compressed information is transmitted based on an uplink resource that is different from a resource used for a precoding matrix indicator (PMI).

The transmitting information associated with the preferred rank and the transmitting information associated with the coordinated rank may further include jointly encoding the preferred rank and coordinated rank, and transmitting information associated with the jointly encoded preferred rank and coordinated rank on a single uplink resource.

The transmitting information associated with the preferred rank and the transmitting information associated with the coordinated rank may further include feeding back the information associated with the coordinated rank based on a codebook of recommended rank or a codebook of restricted rank.

The transmitting information associated with the coordinated rank may further include feeding back the information associated with the coordinated rank based on a bitmap associated with the coordinated rank.

The transmitting information associated with the coordinated rank may further include performing one of dynamic feedback of the information associated with the coordinated rank based on a physical layer signaling and static feedback of the information associated with the coordinated rank based on a higher layer signaling.

The information associated with the coordinated rank is less than or equal to eight bits, and the information associated with the coordinated rank is less than or equal to two bits.

The transmitting information associated with the coordinated rank and the transmitting information associated with the coordinated rank may further include including the information associated with the preferred rank and the information associated with the coordinated rank in a single transmission frame.

In another general aspect, there is provided a communication method of a serving base station corresponding to at least one target terminal in a multiple cell communication system, the method including receiving, from the at least one target terminal, information associated with a preferred rank with respect to the service base station, receiving, from the at least one target terminal, information associated with a coordinated rank with respect to at least one neighbor base station causing interference to the at least one target terminal, and transmitting, to the at least one neighbor base station, the information associated with the coordinated rank with respect to the at least one neighbor base station.

The method may further include receiving, from the at least one neighbor base station, information associated with a coordinated rank with respect to the serving base station.

The method may further include determining a transmission rank applied by the serving base station, based on the information associated with the preferred rank with respect to the serving base station and information associated with a coordinated rank with respect to the serving base station.

The method may further include signaling, to the at least one target terminal, information associated with a coordinated rank with respect to the serving base station.

The method may further include precoding for downlink transmission, based on information associated with a coordinated rank with respect to the serving base station.

The method may further include silencing when a coordinated rank with respect to the serving base station is zero.

In another general aspect, there is provided a target terminal corresponding to a serving base station in a multi-cell communication system, the target terminal including a preferred rank determining unit to determine a preferred rank with respect to the serving base station, a coordinated rank determining unit to determine a coordinated rank with respect to at least one neighbor base station causing interference to the target terminal, and a transmitting unit to transmit information associated with the preferred rank and to transmit information associated with the coordinated rank, to the serving base station or the at least one neighbor base station.

The coordinated rank determining unit may determine the coordinated rank including a recommended rank or a restricted rank with respect to the at least one neighbor base station.

The coordinated rank determining unit may determine at least one of a recommended rank, a range of the recommended rank, a restricted rank, and a range of the restricted rank with respect to the at least one neighbor base station, and the transmitting unit may transmit information associated with the coordinated rank including at least one of the recommended rank, the range of the recommended rank, the restricted rank, and the range of the restricted rank.

The coordinated rank determining unit may generate information associated with an increase in performance expected when the coordinated rank is applied by the at least one neighbor base station, and the transmitting unit may further transmit the information associated with the increase in performance expected.

The coordinated rank determining unit may generate identification information associated with the at least one neighbor base station, and the transmitting unit may transmit the identification information together with the information associated with the coordinated rank.

The coordinated rank determining unit may determine the coordinated rank based on at least one of a type of reception filter used by the target terminal, channel quality information (CQI), a characteristic of a pilot signal used for channel estimation, the preferred rank, and a number of antennas of the target terminals.

The transmitting unit may transmit the information associated with the coordinated rank based on an uplink resource that is different from a resource used for the information associated with the preferred rank and a precoding matrix indicator (PMI).

The transmitting unit may dynamically feed back the information associated with the coordinated rank based on a physical layer signaling or may statically feed back the information associated with the coordinated rank based on a higher layer signaling.

In another general aspect, there is provided a serving base station corresponding to at least one target terminal in a multi-cell communication system, the serving base station including a feedback receiving unit to receive information associated with a preferred rank with respect to the serving base station from the at least one target terminal, and to receive, from at least one target terminal, information associated with a coordinated rank with respect to at least one neighbor base station causing interference to the at least one target terminal, and a rank information exchanging unit to transmit, to the at least one neighbor base station, the information associated with the coordinated rank with respect to the at least one neighbor base station.

The rank information exchanging unit may receive information associated with a coordinated rank with respect to the serving base station, from the at least one neighbor base station.

The serving base station may further include a transmission rank determining unit to determine a transmission rank used by the serving base station, based on the information associated with the preferred rank with respect to the serving base station and information associated with a coordinated rank with respect to the serving base station.

The serving base station may further include a signaling unit to perform signaling, to the at least one target terminal, of information associated with a coordinated rank with respect to the serving base station.

The serving base station may further include a precoder to precode for downlink transmission, based on information associated with a coordinated rank with respect to the serving base station.

According to certain examples, a target terminal, in a multiple input multiple output (MIMO) communication system, may feed back information associated with a coordinated rank with respect to a neighbor base station causing interference to the target terminal. Further, a serving base station may exchange, with the neighbor base station, information associated with a coordinated rank and may perform precoding based on the exchanged information associated with the coordinated rank. Accordingly, inter-cell interference may be reduced.

According to certain examples, a terminal may feed back, to a base station, a relatively small amount of information, and base stations may exchange, with each other, information associated with a coordinated rank. Accordingly, feedback overhead may be reduced. The feedback overhead may be reduced compared with a case where a preferred channel direction of the terminal or a PMI with respect to the interference cell is fed back.

Other features and aspects may be apparent from the following detailed description, the drawings, and the claims.

Figure 1:
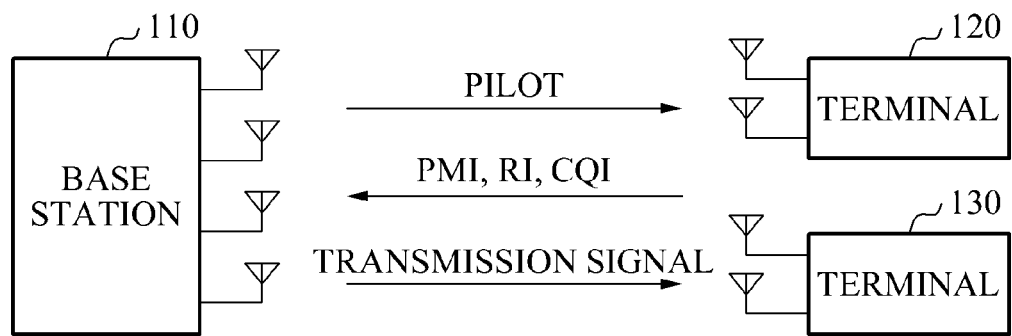
FIG. 1 is a diagram illustrating a closed loop multiple user (MU)-multiple input multiple output (MIMO) communication system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining an understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is provided as an example; however, the sequence of and/or operations is not limited to that set forth herein and may be modified as is known in the art, with the exception of steps and/or operations necessarily occurring in a certain order. Also, descriptions of well-known functions and constructions may be omitted for increased clarity and conciseness.

FIG. 1 illustrates a closed loop multiple user (MU)-multiple input multiple output (MIMO) communication system.

Referring to FIG. 1, the closed loop MU-MIMO communication system may include a base station 110 and terminals 120 and 130.

The base station 110 may obtain information associated with a channel, hereinafter referred to as channel information, from each of terminals 120 and 130. The base station 110 may perform spatial multiplexing based on the channel information. For example, the base station 110 may determine an optimal precoding matrix based on the channel information.

The base station 110 may transmit a pilot signal so that each of the terminals 120 and 130 may measure a corresponding channel. In this example, each of the terminals 120 and 130 may measure the corresponding channel based on the pilot signal.

Each of the terminals 120 and 130 may feed back, to the base station 110, a precoding matrix indictor (PMI), a preferred rank indicator (RI), and channel quality information (CQI) based on the channel information. The PMI may include information associated with a direction of a channel. In this example, the base station 110 may determine an optimal precoding matrix based on the PMI, RI, and CQI fed back from each of the terminals 120 and 130.

The base station 110 may generate a transmission signal by performing precoding based on the precoding matrix, and may transmit the transmission signal via transmission antennas.

In the communication system of FIG. 1, interference may occur near a boundary between cells. As described above, the base station 110 may receive the PMI, RI, and the CQI fed back only from the terminals 120 and 130 corresponding to the base station 110. Thus, the transmission signal generated based on the feedback may result in interference to a terminal located near an edge of a neighbor cell. Accordingly, communication performance may be reduced due to the interference. A multi-cell communication system may be illustrated as shown in FIG. 2.

Figure 2:
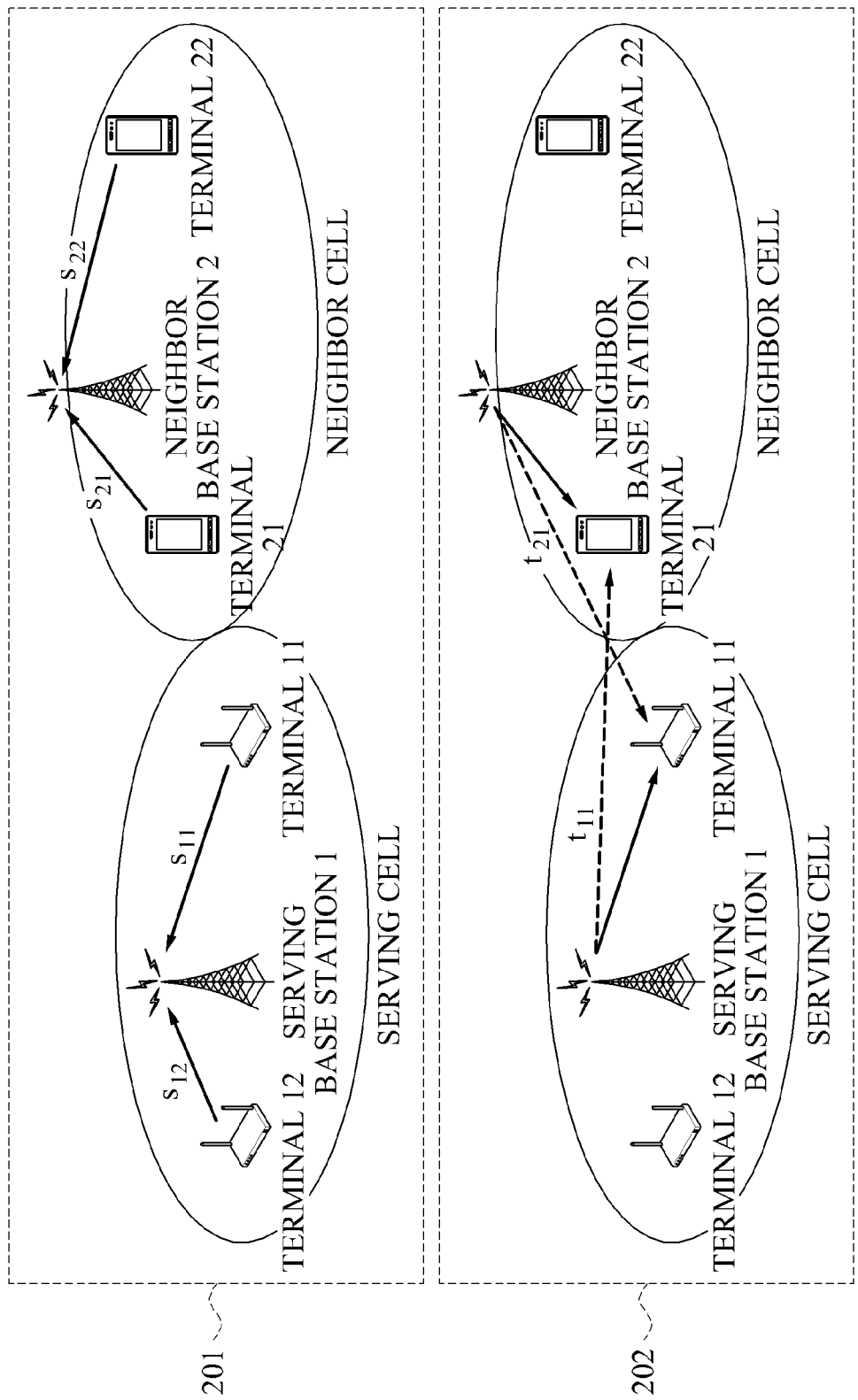
FIG. 2 is a diagram illustrating an example of a multi-cell communication system performing a codebook-based beamforming.

FIG. 2 illustrates an example of a multi-cell communication system performing a codebook-based beamforming.

Referring to FIG. 2, a serving base station 1, a terminal 11, and a terminal 12 may be included in a serving cell. A neighbor base station 2, terminal 21 and a terminal 22 may be included in a neighbor cell. A terminal "ab" may denote a "$b^{th}$" terminal of a base station "a". Although two base stations are illustrated for ease of description, the communication method described below may be applicable to a case including any number of base stations. The communication method in the serving cell may be applicable to the neighbor cell and thus, descriptions are made in terms of the serving cell.

The multi-cell communication system performing the codebook-based beamforming may perform a channel measuring process illustrated by reference numeral 201 and a signal transmitting process illustrated by reference numeral 202.

The channel measuring process may be performed as described below. Each terminal may determine a preferred PMI with respect to a corresponding base station. The preferred PMI may be denoted by "$s_{ab}$". "$s_{ab}$" may denote a PMI preferred by a "$b^{th}$" terminal of a base station "a". Each terminal may feed back its own preferred PMI to a corresponding base station.

The signal transmitting process may be performed as described below. For the descriptive example below, it may be assumed that each base station schedules a single terminal for each serving sector for a transmission based on requested PMI. When the neighbor base station 2 transmits a transmission signal $t_{21}$ based on PMI $s_{21}$, the terminal 11 may receive a strong signal from the neighbor base station 2. Therefore, the terminal 11 may lose a transmission signal $t_{11}$ transmitted from the serving base station 1. The terminal 11, located near an edge of a cell, may not clearly receive a signal from the serving base station 1, due to interference from the neighbor base station 2. Similar interference may occur for the terminal 21.

If two base stations use a codebook vector without coordination between the two base stations, interference may frequently occur.

To reduce the inter-cell interference, the multi-cell MIMO communication system may perform PMI coordination as described below.

A target terminal corresponding to a serving base station 1 may feed back a preferred PMI with respect to the serving base station 1. The preferred PMI with respect to the serving base station 1 may be a codebook index to maximize a signal to noise ratio (SNR) between the serving base station 1 and the target terminal. The target terminal may feed back a plurality of preferred PMIs so that the serving base station 1 may more flexibly perform scheduling.

The target terminal may feed back a preferred PMI with respect to a neighbor base station 2 to the serving base station 1. The preferred PMI with respect to the neighbor base station 2 may be a codebook index to minimize an SNR with respect to a signal received by the target terminal from the neighbor base station 2.

The serving base station 1 may exchange, with the neighbor base station 2, information fed back from the target terminal. The serving base station 1 may perform precoding to maximize a signal to interference and noise ratio (SINR) with respect to the target terminal, based on the information fed back from the target terminal and information received from the neighbor base station 2.

A coordinated multi-point transmission and reception (CoMP) scheme may help reduce the inter-cell interference in a multi-cell environment. Information exchange between base stations may be performed to implement a CoMP scheme. When the base stations only share channel information, a coordinated beamforming (CB) scheme may be applied; when the base stations share data in addition to the channel information, a joint processing (JP) scheme may be applied.

According to certain examples, the base stations may exchange information associated with a rank when the CoMP scheme is applied. The base stations may exchange information associated with a recommended rank or a restricted rank with respect to their corresponding neighbor base stations. The recommended rank or the restricted rank may be referred to as a coordinated rank. A rank may correspond to a number of streams or a number of layers. One layer may correspond to one effective antenna, and the number of layers or effective antennas may determine the number of pilot signals.

Figure 3:
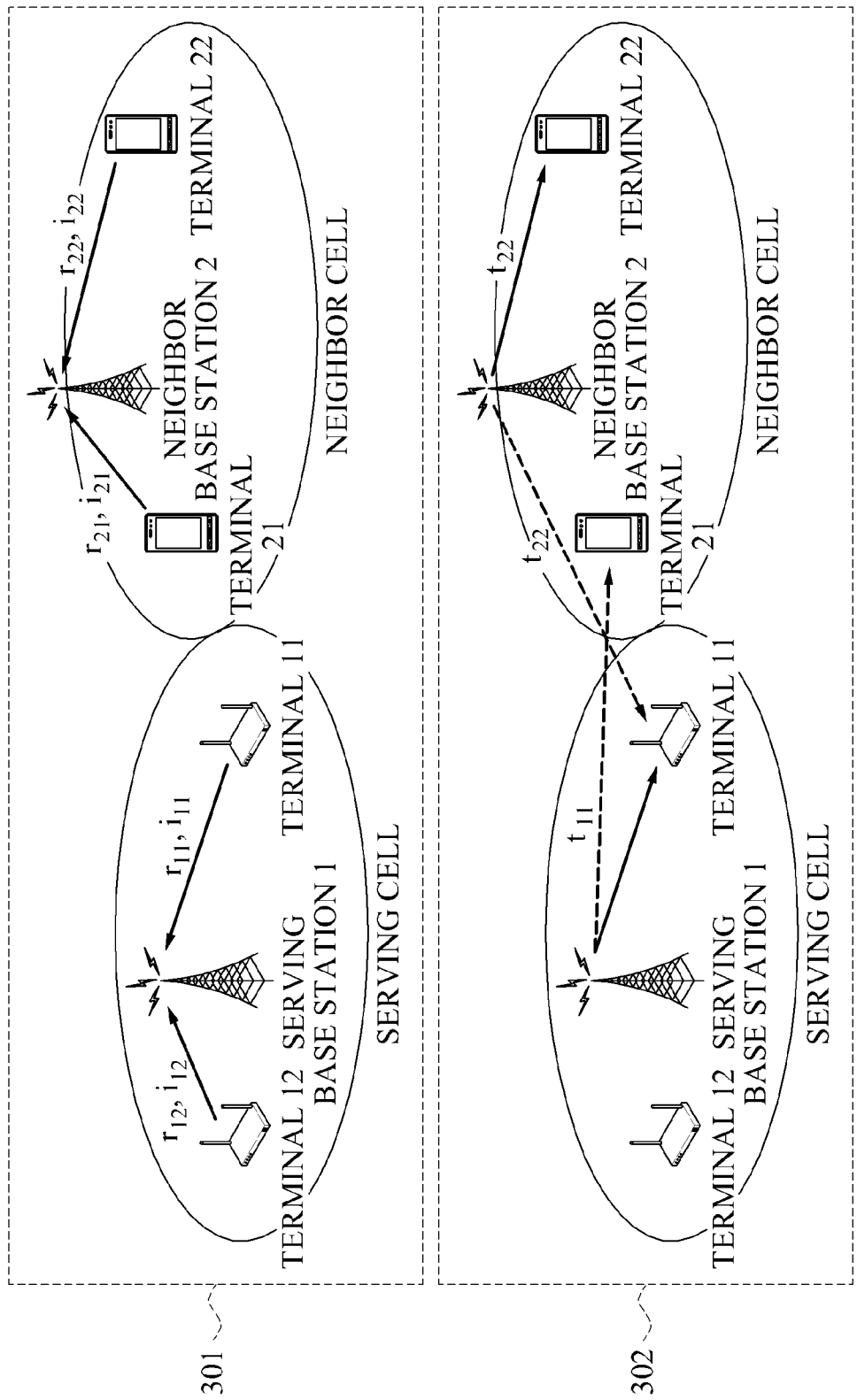
FIG. 3 is a diagram illustrating a multi-cell communication system exchanging information associated with a coordinated rank according to an embodiment.

FIG. 3 illustrates a multi-cell communication system exchanging information associated with a coordinated rank according to an embodiment.

Referring to FIG. 3, a communication method of the multi-cell communication system exchanging coordinated rank information may include two operations. According to one example, the communication method may include sharing information with respect to a coordinated rank, as illustrated by reference numeral 301, and transmitting data based on information associated with the exchanged coordinated rank, as illustrated by reference numeral 302.

Referring to FIG. 3, a serving cell may include a serving base station 1 and target terminals, for example, a terminal 11 and a terminal 12. A neighbor cell may include a neighbor base station 2 and neighbor terminals, for example, a terminal 21 and a terminal 22. Although two base stations are illustrated for ease of description, the communication method described below may be applicable to a case including any number of base stations. The communication method in the serving cell may be applicable to the neighbor cell and thus, descriptions are made in terms of the serving cell.

The coordinated rank $i_{11}$ and $i_{12}$ may include a recommended rank or a restricted rank. The recommended rank may denote a rank recommended for use by the neighbor base station 2 causing interference to the target terminal, and the restricted rank may denote a rank not recommended for use by the neighbor base station 2.

First, the recommended rank is described below.

Each of the target terminals may transmit, to the serving base station 1, information associated with a corresponding preferred rank $r_{11}$ and $r_{12}$ with respect to the serving base station 1. The preferred rank may be a rank selected to maximize a downlink throughput from the serving base station 1.

Each of the target terminals may transmit, to the serving base station 1, information associated with a corresponding recommended rank $i_{11}$ and $i_{12}$ with respect to the neighbor base station 2. The recommended rank may be a rank selected to minimize interference from the neighbor base station 2. The information associated with the recommended rank may be fed back to the neighbor base station 2.

The serving base station 1 may exchange, with the neighbor base station 2, the information fed back from the target terminal. For the descriptive example below, it may be assumed that each base station schedules a single terminal for each serving sector for a transmission based on the recommended rank, using a coordinated scheduling algorithm. A controller may perform scheduling.

For example, when $i_{11}=r_{22}$, the neighbor base station 2 may use, as a rank of a transmission signal $t_{22}$, the recommended rank $i_{11}$ with respect to the neighbor base station 2, fed back from the terminal 11 (that is, the preferred rank $r_{22}$). The neighbor base station 2 may schedule the terminal 22, instead of the terminal 21. When the terminal 11 receives a transmission signal corresponding to the preferred rank $r_{11}$ from the serving base station 1, the terminal 11 may also receive interference corresponding to the recommended rank $i_{11}$ from the neighbor base station 2. Therefore, the neighbor cell substantially minimizes interference to the terminal 11, which is located near a cell boundary.

Second, the restricted rank is described below.

As described above, each of the target terminals may transmit, to the serving base station 1, information associated with a corresponding preferred rank $r_{11}$ and $r_{12}$ with respect to the serving base station 1.

Each of the target terminals may transmit, to the serving base station 1, information associated with a corresponding restricted rank $i_{11}$ and $i_{12}$ with respect to the neighbor base station 2. The restricted rank may be a rank selected to maximize interference from the neighbor base station 2. The information associated with the restricted rank may be fed back to the neighbor base station 2.

The serving base station 1 may exchange, with the neighbor base station 2, information fed back from the target terminal. For the descriptive example below, it may be assumed that each base station schedules a single terminal for each serving sector for a transmission based on the restricted rank, using a coordinated scheduling algorithm. A controller may perform scheduling.

For example, when $i_{11} \neq r_{22}$, the neighbor base station 2 may use, as a rank of the transmission signal $t_{22}$, the preferred rank $r_{22}$, which is different from the restricted rank $i_{11}$ with respect to the neighbor base station 2, fed back from the terminal 11. The neighbor base station 2 may schedule the terminal 22, instead of the terminal 21. When the terminal 11 receives a transmission signal $t_{11}$ corresponding to the preferred rank $r_{11}$ from the serving base station 1, the terminal 11 may also receive, from the neighbor base station 2, interference corresponding to a rank which is different from the restricted rank $i_{11}$. Accordingly, the neighbor cell substantially prevents the interference to terminal 11, which is located near a cell boundary, from becoming maximized.

The inter-cell interference may be reduced by exchanging information associated with a coordinated rank, between cells that are located adjacent to each other. In this example, the information associated with the coordinated rank may be fed back to the base station based on a bitmap or a rank index of a corresponding codebook. The information associated with the rank may be transmitted with a relatively small amount of data and thus, overhead expended for exchanging information used to perform the CoMP scheme may be reduced. In particular, the overhead may be reduced compared with a scheme where base stations exchange a recommended PMI.

For example, where four neighbor cells exist adjacent to the serving cell in a 4×4 MIMO LTE (Long Term Evolution) system, PMI and a rank may be PMI$\in\{1, 2, \ldots, 16\}$ and rank $\in\{1,2,3,4\}$. When the target terminal transmits PMIs with respect to the four neighbor cells, a feedback of 16 bits may be used since four bits per cell and total four cells are used. However, in terms of rank, two bits per cell are used and thus, a feedback of eight bits may be sufficient. If the same coordinated rank is fed back to the four neighbor cells, a feedback of only two bits may be used. Therefore, feedback overhead may be reduced by a factor of 8 compared to a PMI cooperation method.

Figure 4:
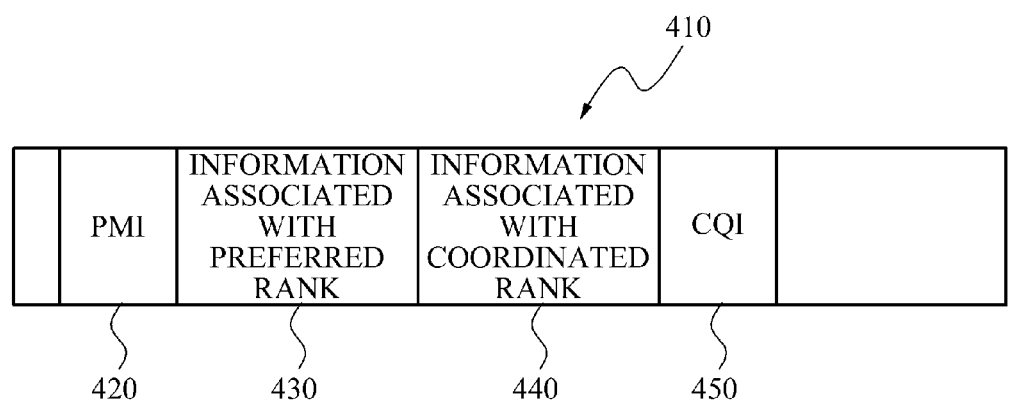
FIG. 4 is a diagram illustrating an example of a transmission frame that a target terminal uses to transmit information associated with a coordinated rank to a serving base station.

FIG. 4 illustrates an example of a transmission frame that a target terminal uses to transmit information associated with a coordinated rank to a serving base station.

Referring to FIG. 4, the transmission frame 410, which the target terminal transmits to the serving base station for uplink feedback, may include a first area 430 which includes information associated with a preferred rank, and a second area 440 which includes information associated with a coordinated rank. The second area 440 may be allocated separately from the first area 430. The transmission frame 410 may include a third area 420 which includes a PMI, and a fourth area 450 which includes a CQI.

In this example, the target terminal may integrate the first area 430 and the second area 440 to minimize feedback overhead. The target terminal may also compress the information associated with the preferred rank and the information associated with the coordinated rank, and may transmit the respective information in a compressed format. Further, target terminal may jointly encode the preferred rank and the coordinated rank, in order to transmit the information associated with the preferred rank and the coordinated rank based on a single uplink resource. The target terminal may transmit the information associated with the coordinated rank to the serving base station based on the newly configured transmission frame 410.

Figure 5:
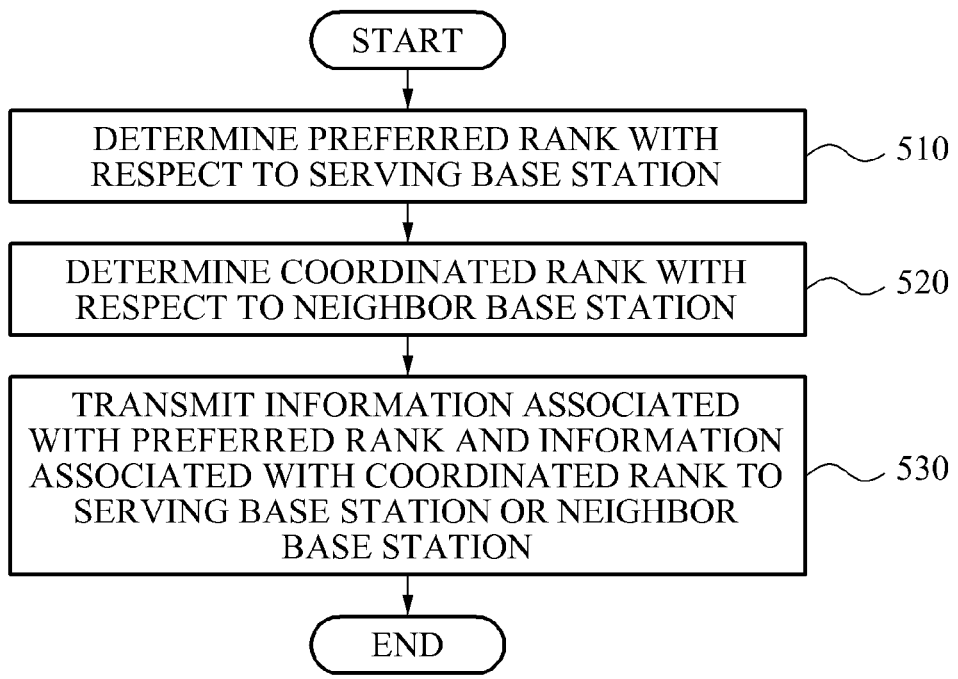
FIG. 5 is a flowchart illustrating an example of a communication method of a target terminal feeding back information associated with a coordinated rank.

FIG. 5 illustrates an example of a communication method of a target terminal feeding back information associated with a coordinated rank.

A target terminal, corresponding to a serving base station in a multi-cell communication system, determines a preferred rank with respect to the serving base station, in operation 510.

The target terminal determines a coordinated rank with respect to at least one neighbor base station causing interference to the target terminal, in operation 520. The target terminal may optimize both the preferred rank and the coordinated rank to substantially maximize a performance of the system. The target terminal may determine the coordinated rank based on the preferred rank to substantially minimize interference from the at least one neighbor base station. In this example, the coordinated rank may include a recommended rank or a restricted rank. When the target terminal determines the coordinated rank, the target terminal may also determine at least one of a recommended rank, a range of the recommended rank, a restricted rank, and a range of the restricted rank with respect to the at least one neighbor base station. In other words, the coordinated rank may indicate the range of the recommended rank or the range of the restricted rank.

The target terminal may generate information associated with an increase in performance expected when the coordinated rank is applied by the at least one neighbor base station. The target terminal may generate identification information associated with the at least one neighbor base station corresponding to the determined coordinated rank.

The target terminal may transmit, to the serving base station, information associated the preferred rank and information associated with the coordinated rank, in operation 530. The target terminal may also transmit, to at least one neighbor base station, the information associated with the preferred rank and the information associated with the coordinated rank, in operation 530. The target terminal may transmit the information associated with the coordinated rank based on a codebook of recommended or restricted rank values, or based on a bitmap associated with the coordinated rank. The target terminal may dynamically transmit the information associated with the coordinated rank based on a physical layer signaling, or may statically transmit the information associated with the coordinated rank based on a higher layer signaling.

The information associated with the coordinated rank may include at least one of the recommended rank, the range of the recommended rank, the restricted rank, and the range of the restricted rank. The information associated with the coordinated rank may include the information associated with an increase in performance expected when the coordinated rank is applied by the at least one neighbor base station, or may include the identification information associated with the at least one neighbor base station corresponding to the coordinated rank. The identification information associated with the at least one neighbor base station may be information indicating at least one base station that corresponds to the information associated with the corresponding coordinated rank.

The target terminal may transmit information associated with the coordinated rank, based on an uplink resource which is different from a resource for information associated with the preferred rank and a PMI.

A method of determining a coordinated rank by the target terminal is described below. The target terminal may determine the coordinated rank based on at least one of a type of reception filter applied by the target terminal, channel quality information (CQI), a pilot characteristic for channel estimation, a preferred rank, and the number of antennas of the target terminal.

The coordinated rank may vary according to whether the reception filter at the target terminal is one of a minimum-mean-square-error (MMSE) filter, a maximum ratio combining (MRC) filter, and a maximum likelihood (ML) filter. Further, the coordinated rank may vary according to a CQI calculation method. The coordinated rank may also vary according to an assumption associated with a channel covariance matrix; an assumption associated with a long-term measurement; an assumption associated with an interference channel measurement using a channel state information-reference signal (CSI-RS), a midamble, or a CRS; and the like. The coordinated rank may additionally vary according to whether a demodulation reference signal (DM-RS), a reference signal for each terminal, or a dedicated pilot signal exists. Furthermore, the coordinated rank may vary according to the preferred rank with respect to the serving base station, or according to the number of antennas of the target terminal.

For example, when the target terminal applies an MMSE reception filter and measures the DM-RS, the target terminal may determine the coordinated rank to minimize a sum of a transmission rank of the neighbor base station causing interference and a transmission rank of the serving base station corresponding to the target terminal. The recommended rank may be determined to be relatively low and the restricted rank may be determined to be relatively high. The sum of the transmission rank of the serving base station and the transmission rank of the neighbor base station may be less than the total number of antennas of the target terminals. The target terminal may determine, as the coordinated rank, a total sum of ranks for a plurality of neighbor base stations causing interference. The target terminal may also determine, as the coordinated rank, a rank for each of the plurality of neighbor base stations causing interference.

When the target terminal applies an MMSE reception filter and does not measure the DM-RS, the recommended rank may be determined to be relatively high and the restricted rank may be determined to be relatively low.

Figure 6:
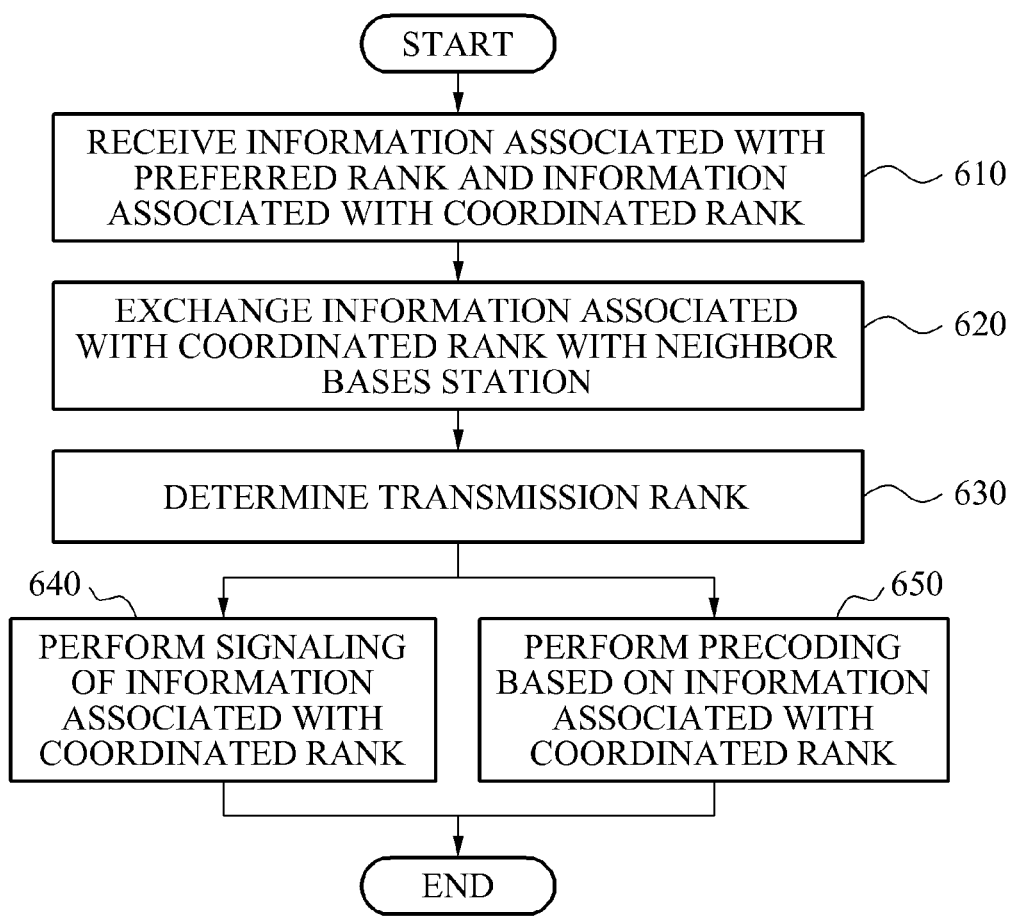
FIG. 6 is a flowchart illustrating an example of a communication method of a serving base station exchanging, with a neighbor base station, information associated with a coordinated rank.

FIG. 6 illustrates an example of a communication method of a serving base station exchanging, with a neighbor base station, information associated with a coordinated rank.

The serving base station, corresponding to at least one target terminal in a multi-cell communication system, may receive, from the at least one target terminal, information associated with a preferred rank with respect to the serving base station. The serving base station may also receive, from the at least one target terminal, information associated with a coordinated rank with respect to at least one neighbor base station causing interference to the at least one target terminal, in operation 610.

The serving base station exchanges, with the at least one neighbor base station, information associated with the coordinated rank, in operation 620. That is, the serving base station may transmit, to the at least one neighbor base station, the information associated with the coordinated rank with respect to the at least one neighbor base station, and may receive, from the at least one neighbor base station, information associated with a coordinated rank with respect to the serving base station. As an example, an X2 interface may be used to exchange information between base stations.

The serving base station determines a transmission rank to be applied by the serving base station, based on the information associated with the preferred rank with respect to the serving base station and the information associated with the coordinated rank with respect to the serving base station, in operation 630. The transmission rank may be a rank to be applied when the serving base station performs a downlink transmission. The information associated with the coordinate rank with respect to the serving base station may be periodically or aperiodically updated. That is, the serving base station may periodically or aperiodically receive, from the at least one neighbor base station, the information associated with the coordinated rank with respect to the serving base station. Even if a portion or all of the information associated with the coordinated rank with respect to the serving base station is not updated, depending on a communication system environment, communication may exhibit performance similar to a case where the information associated with the coordinated rank with respect to the serving base station is updated, since the information associated with the coordinated rank with respect to the serving base station may include a statistical feature.

The serving base station may perform signaling, to the at least one target terminal, of the information associated with the coordinated rank with respect to the serving base station, in operation 640. The serving base station may also perform precoding for a downlink transmission based on the information associated with the coordinated rank with respect to the serving base station, in operation 650. The serving base station may perform the precoding for the downlink transmission based on the determined transmission rank.

As an example, when the coordinated rank with respect to the serving base station is '0', the serving base station may perform silencing. That is, when the recommended rank is '0', the base station may not transmit any data and thus may reduce interference to the at least one neighbor cell.

The method according to the above-described examples may be recorded, stored, or fixed in one or more non-transitory computer-readable media including program instructions to be implemented by a computer to cause a processor to execute or perform various operations. The media may also include, alone or in combination with the program instructions, data files, data structures, and the like. The media and program instructions may be those specifically designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

Figure 7:
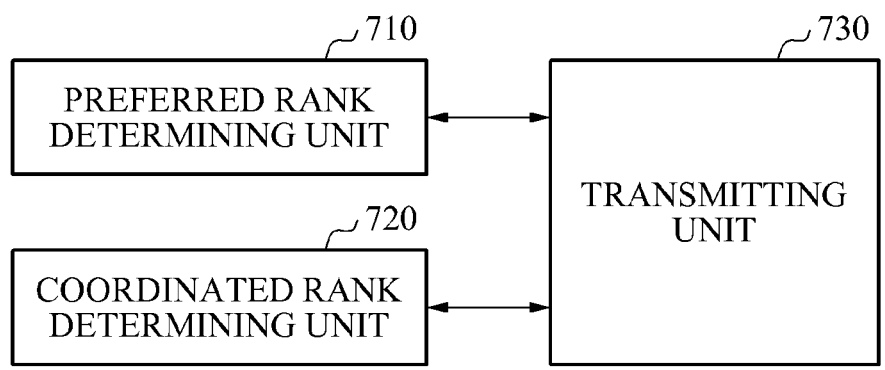
FIG. 7 is a block diagram illustrating an example of a target terminal.

FIG. 7 illustrates an example of a target terminal.

The target terminal, corresponding to a serving base station in a multi-cell communication system, may include a preferred rank determining unit 710, a coordinated rank determining unit 720, and a transmitting unit 730.

The preferred rank determining unit 710 may determine a preferred rank with respect to the serving base station.

The coordinated rank determining unit 720 may determine a coordinated rank with respect to at least one neighbor base station causing interference to the target terminal.

The transmitting unit 730 may transmit, to the serving base station or the at least one neighbor base station, the information associated with the preferred rank and the information associated with the coordinated rank.

Figure 8:
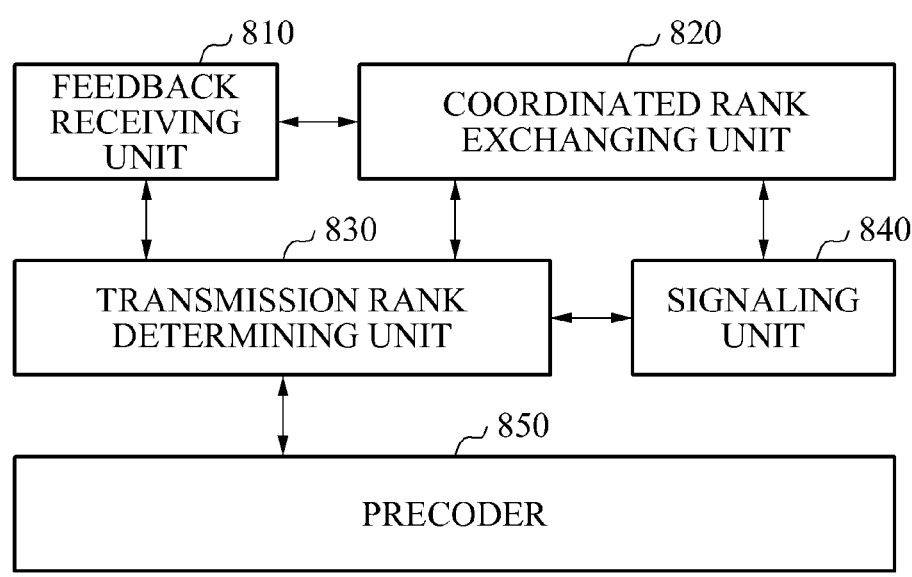
FIG. 8 is a block diagram illustrating an example of a serving base station.

FIG. 8 illustrates an example of a serving base station.

Referring to FIG. 8, a serving base station corresponding to at least one target terminal in a multi-cell communication system may include a feedback receiving unit 810, a coordinated rank exchanging unit 820, a transmission rank determining unit 830, a signaling unit 840, and a precoder 850.

The feedback receiving unit 810 may receive, from the at least one target terminal, information associated with a preferred rank with respect to the serving base station, and may receive, from the at least one target terminal, information associated with a coordinated rank associated with at least one neighbor base station causing interference to the at least one target terminal.

The coordinated rank exchanging unit 820 may transmit, to the at least one neighbor base station, the information associated with the coordinated rank with respect to the at least one neighbor base station, and may receive, from the at least one neighbor base station, information associated with a coordinated rank with respect to the serving base station.

The transmission rank determining unit 830 may determine a transmission rank to be applied by the serving base station, based on the information associated with the preferred rank with respect to the serving base station and the information associated with the coordinated rank with respect to the serving base station.

The signaling unit 840 may perform signaling, to the at least one target terminal, of the information associated with the coordinated rank with respect to the serving base station.

The pre-coder 850 may perform precoding for a downlink transmission, based on information associated with the transmission rank with respect to the serving bases station.

The examples described with respect to FIGS. 1 through 6 may be applicable to the target terminal and the serving base station illustrated in FIGS. 7 and 8 and thus, detailed descriptions thereof will be omitted.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a target terminal corresponding to a serving base station in a multi-cell communication system, the method comprising:
   determining a preferred rank with respect to the serving base station, wherein the preferred rank is a rank selected to maximize a downlink throughput from the serving base station;
   determining a coordinated rank consisting of a recommended rank that minimizes interference from at least one neighbor base station or a restricted rank that maximizes interference from the at least one neighbor base station, wherein the recommended rank and restricted rank are determined without the use of a preferred precoding matrix indicator (PMI);
   transmitting information associated with the preferred rank to the serving base station or the at least one neighbor base station; and
   transmitting information associated with the coordinated rank to the serving base station or the at least one neighbor base station.

2. The method of claim 1, wherein the determining of the coordinated rank comprises determining the coordinated rank based on the preferred rank, such that an amount of interference received from the at least one neighbor base station is minimized.

3. The method of claim 1, wherein the determining of the coordinated rank comprises determining the coordinated rank including the recommended rank or the restricted rank with respect to the at least one neighbor base station.

4. The method of claim 1, wherein:
   the determining of the coordinated rank comprises determining at least one of the recommended rank, a range of the recommended rank, the restricted rank, or a range of the restricted rank with respect to the at least one neighbor base station; and
   the transmitting comprises transmitting the information associated with the coordinated rank including at least one of the recommend rank, the range of the recommended rank, the restricted rank, and the range of the restricted rank.

5. The method of claim 1, wherein:
   the determining of the coordinated rank comprises generating information associated with an increase in performance expected when the coordinated rank is applied by the at least one neighbor base station; and
   the transmitting information associated with the coordinated rank further comprises transmitting information associated with the increase in performance expected.

6. The method of claim 1, further comprising:
   generating identification information associated with the at least one neighbor base station, and
   wherein the transmitting information associated with the coordinated rank further comprises transmitting the identification information to the serving base station.

7. The method of claim 1, wherein the determining of the coordinated rank comprises determining the coordinated rank based on at least one of a type of reception filter used by the target terminal, channel quality information (CQI), a characteristic of a pilot signal used for channel estimation, the preferred rank, or a number of antennas of the target terminals.

8. The method of claim 1, wherein the transmitting information associated with the coordinated rank further comprises transmitting based on an uplink resource that is different from a resource used for the information associated with the preferred rank and a precoding matrix indicator (PMI).

9. The method of claim 1, wherein:
   the transmitting information associated with the preferred rank further comprises compressing the information associated with the preferred rank; and
   the transmitting information associated with the coordinated rank further comprises compressing the information associated with the coordinated rank,
   wherein the compressed information associated with the preferred rank and the coordinated rank is transmitted based on an uplink resource that is different from a resource used for a precoding matrix indicator (PMI).

10. The method of claim 1, wherein the transmitting information associated with the preferred rank and the transmitting information associated with the coordinated rank further comprises:
    jointly encoding the preferred rank and the coordinated rank; and
    transmitting information associated with the jointly encoded preferred rank and the coordinated rank on a single uplink resource.

11. The method of claim 1, wherein transmitting information associated with the preferred rank and the transmitting information associated with the coordinated rank further comprises feeding back the information associated with the coordinated rank based on a codebook of the recommended rank or a codebook of the restricted rank,
    wherein the recommended rank is a rank that minimizes interference from the at least one neighbor base station, and the restricted rank is a rank that maximizes interference from the at least one neighbor base station.

12. The method of claim 1, wherein transmitting information associated with the coordinated rank further comprises feeding back the information associated with the coordinated rank based on a bitmap associated with the coordinated rank.

13. The method of claim 1, wherein the transmitting information associated with the coordinated rank further comprises performing one of dynamic feedback of the information associated with the coordinated rank based on a physical layer signaling and static feedback of the information associated with the coordinated rank based on a higher layer signaling.

14. The method of claim 1, wherein the information associated with the coordinated rank is less than or equal to eight bits.

15. The method of claim 14, wherein the information associated with the coordinated rank is less than or equal to two bits.

16. The method of claim 1, wherein the transmitting information associated with the preferred rank and the transmitting information associated with the coordinated rank further comprises including the information associated with the preferred rank and the information associated with the coordinated rank in a single transmission frame.

17. A communication method of a serving base station corresponding to at least one target terminal in a multiple cell communication system, the method comprising:
receiving, from the at least one target terminal, information associated with a preferred rank with respect to the service base station, wherein the preferred rank is a rank selected to maximize a downlink throughput from the serving base station;
receiving, from the at least one target terminal, information associated with a coordinated rank consisting of a recommended rank that minimizes interference from at least one neighbor base station or a restricted rank that maximizes interference from the at least one neighbor base station, wherein the recommended rank and restricted rank are received without a preferred precoding matrix indicator (PMI);
transmitting, to the at least one neighbor base station, the information associated with the coordinated rank with respect to the at least one neighbor base station;
determining a transmission rank applied by the serving base station, based on the information associated with the preferred rank with respect to the serving base station and information associated with a coordinated rank with respect to the serving base station;
wherein the serving base station signals information associated with the coordinated rank with respect to the serving base station to the target terminal; and
wherein the serving base station precodes for downlink transmission, based on information associated with the coordinated rank with respect to the serving base station.

18. The method of claim 17, further comprising:
receiving, from the at least one neighbor base station, information associated with a coordinated rank with respect to the serving base station, wherein the coordinated rank with respect to the serving base station comprises a recommended rank that minimizes interference from the serving base station or a restricted rank that maximizes interference from the serving base station.

19. The method of claim 17, further comprising:
determining a transmission rank applied by the serving base station, based on the information associated with the preferred rank and information associated with a coordinated rank.

20. The method of claim 17, further comprising:
signaling, to the at least one target terminal, information associated with a coordinated rank.

21. The method of claim 17, further comprising:
precoding for downlink transmission, based on information associated with a coordinated rank.

22. The method of claim 17, further comprising:
silencing when a coordinated rank is zero.

23. A target terminal corresponding to a serving base station in a multi-cell communication system, the target terminal comprising:
a preferred rank determining unit configured to determine a preferred rank with respect to the serving base station, wherein the preferred rank is a rank selected to maximize a downlink throughput from the serving base station;
a coordinated rank determining unit configured to determine a coordinated rank consisting of a recommended rank that minimizes interference from at least one neighbor base station or a restricted rank that maximizes interference from the at least one neighbor base station, wherein the recommended rank and restricted rank are determined without the use of a preferred precoding matrix indicator (PMI); and
a transmitting unit configured to transmit information associated with the preferred rank and to transmit information associated with the coordinated rank, to the serving base station or the at least one neighbor base station.

24. The target terminal of claim 23, wherein the coordinated rank determining unit is further configured to determine the coordinated rank including a recommended rank or a restricted rank with respect to the at least one neighbor base station.

25. The target terminal of claim 23, wherein:
the coordinated rank determining unit is further configured to determine at least one of the recommended rank, a range of the recommended rank, the restricted rank, or a range of the restricted rank with respect to the at least one neighbor base station; and
the transmitting unit is further configured to transmit information associated with the coordinated rank including at least one of the recommended rank, the range of the recommended rank, the restricted rank, and the range of the restricted rank.

26. The target terminal of claim 23, wherein:
the coordinated rank determining unit is further configured to generate information associated with an increase in performance expected when the coordinated rank is applied by the at least one neighbor base station; and
the transmitting unit is further configured to transmit information associated with the increase in performance expected.

27. The target terminal of claim 23, wherein:
the coordinated rank determining unit is further configured to generate identification information associated with the at least one neighbor base station; and
the transmitting unit is further configured to transmit the identification information together with the information associated with the coordinated rank.

28. The target terminal of claim 23, wherein the coordinated rank determining unit is further configured to determine the coordinated rank based on at least one of a type of reception filter used by the target terminal, channel quality information (CQI), a characteristic of a pilot signal used for channel estimation, the preferred rank, or a number of antennas of the target terminals.

29. The target terminal of claim 23, wherein the transmitting unit is further configured to transmit the information associated with the coordinated rank based on an uplink resource that is different from a resource used for the information associated with the preferred rank and a precoding matrix indicator (PMI).

30. The target terminal of claim 23, wherein the transmitting unit is further configured to dynamically feed back the information associated with the coordinated rank based on a physical layer signaling or statically feeds back the information associated with the coordinated rank based on a higher layer signaling.

31. A serving base station corresponding to at least one target terminal in a multi-cell communication system, the serving base station comprising:
a feedback receiving unit configured:
to receive, from at the least one target terminal, information associated with a preferred rank with respect to the serving base station from the at least one target terminal, wherein the preferred rank is a rank selected to maximize a downlink throughput from the serving base station, and to receive, from at the least one target terminal, information associated with a coordinated rank consisting of a recommended rank that minimizes interference from at least one neighbor base station or a restricted rank that maximizes interference from the at least one neighbor base station, wherein the recommended rank and restricted rank are received without a preferred precoding matrix indicator (PMI);

a rank information exchanging unit configured to transmit, to the at least one neighbor base station, the information associated with the coordinated rank with respect to the at least one neighbor base station;

a transmission rank determining unit configured to determine a transmission rank applied by the serving base station, based on the information associated with the preferred rank with respect to the serving base station and information associated with a coordinated rank with respect to the serving base station;

a signaling unit configured to signal information associated with the coordinated rank with respect to the serving base station to the target terminal; and a pre-coder configured to perform precoding for a downlink transmission, based on information associated with the transmission rank with respect to the serving base station.

32. The serving base station of claim 31, wherein the rank information exchanging unit is further configured to receive information associated with a coordinated rank with respect to the serving base station, from the at least one neighbor base station, wherein the coordinated rank with respect to the serving base station comprises a recommended rank that minimizes interference from the serving base station or a restricted rank that maximizes interference from the serving base station.

33. The serving base station of claim 31, further comprising:

a transmission rank determining unit configured to determine a transmission rank used by the serving base station, based on the information associated with the preferred rank and information associated with a coordinated rank.

34. The serving base station of claim 31, further comprising:

a signaling unit configured to perform signaling, to the at least one target terminal, of information associated with a coordinated rank.

35. The serving base station of claim 31, further comprising:

a precoder configured to precode for downlink transmission, based on information associated with a coordinated rank.

* * * * *